J. ARNOLD
SHUTTER-FASTENER.

No. 171,336.  Patented Dec. 21, 1875.

WITNESSES:
P. C. Dieterich
W. C. McArthur

INVENTOR.
John Arnold
per
T. H. Alexander
ATTORNEY.

UNITED STATES PATENT OFFICE.

JOHN ARNOLD, OF NEWARK, NEW JERSEY.

IMPROVEMENT IN SHUTTER-FASTENERS.

Specification forming part of Letters Patent No. 171,336, dated December 21, 1875; application filed November 20, 1875.

CASE D.

*To all whom it may concern:*

Be it known that I, JOHN ARNOLD, of Newark, in the county of Essex and State of New Jersey, have invented certain new and useful Improvements in Shutter-Fasteners; and I do hereby declare that the following is a full, clear, and exact description thereof, reference being had to the accompanying drawings and to the letters of reference marked thereon, which form part of this specification.

The nature of my invention consists in the novel construction, arrangement, and combination of parts of a shutter-fastener, as will be hereinafter more fully set forth and definitely claimed.

In order to enable others skilled in the art to which my invention appertains to make and use the same, I will now proceed to describe its construction and operation, referring to the annexed drawing, in which—

Figure 1:
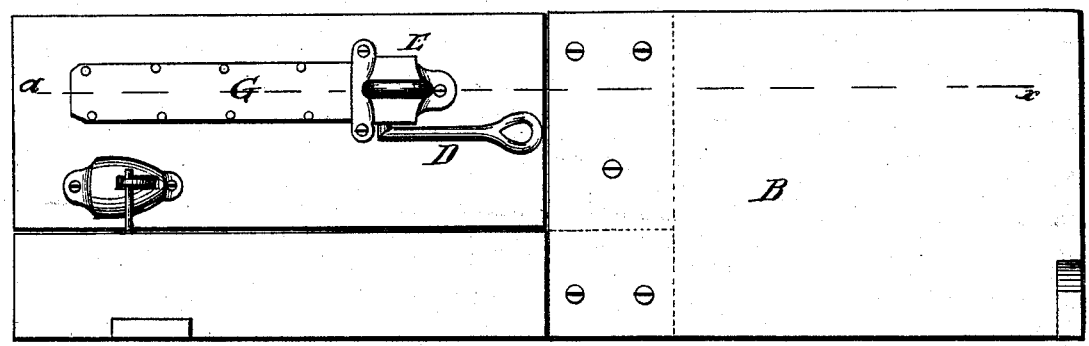
Figure 2:
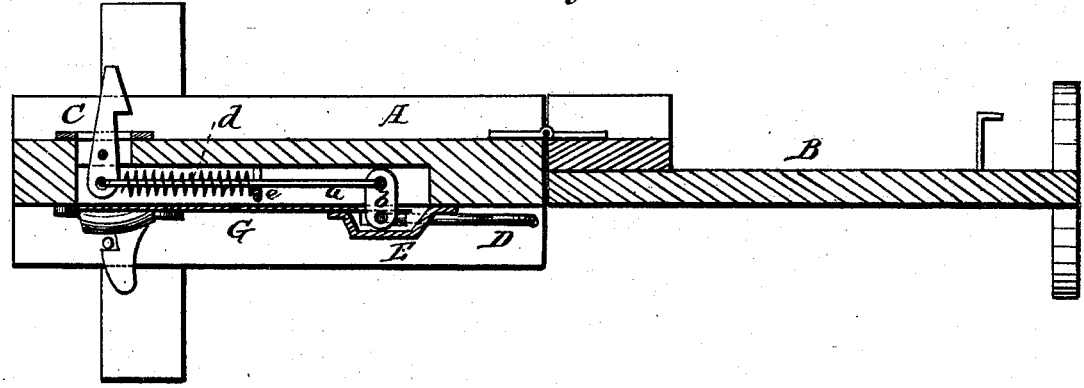

Figure 1 is a front view of my invention. Fig. 2 is a longitudinal section of the same.

A represents a part of a window-shutter hinged to the frame B in the usual manner. C is the ordinary hook for fastening back the shutter when open. The inner end of this hook is, by a rod, *a*, connected with the inner end of a plate, *b*, the outer end of said plate being attached to the end of an L-shaped handle, D, which is placed in a box or case, E, secured on the inner side of the shutter. From this case a plate, G, extends to cover the mortise or recess in the shutter, in which the above parts are placed. Within said recess is a guide, *e*, through which the rod *a* passes, and around this rod, between the guide and the inner end of the hook C, is placed a spiral spring, *d*, as shown in Fig. 2.

In closing the shutter, the operator only pulls on the handle D in the most easy and natural way, loosening the hook thereby, and as the shutter swings around, the handle swings out, obtaining a leverage that enables the operator to push or pull, handling it perfectly even in windy weather, and when the the blind is hooked shut and the handle released, it swings back to its first position by the action of the spring.

Having thus fully described my invention, what I claim as new, and desire to secure by Letters Patent, is—

The combination, with shutter A and hook C, of the rod *a*, spring *d*, plate *b*, and handle D, together with the box E and covering-plate G, all as and for the purposes herein set forth.

In testimony that I claim the foregoing as my own I affix my signature in presence of two witnesses.

JOHN ARNOLD.

Witnesses:
A. B. JOHNSON,
F. SCHNEIDER.